United States Patent
Connelly

(10) Patent No.: US 6,212,579 B1
(45) Date of Patent: *Apr. 3, 2001

(54) SOFTWARE DEVICE FOR SUPPORTING A NEW CLASS OF PC PERIPHERALS

(75) Inventor: Jay Connelly, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/235,462

(22) Filed: Jan. 22, 1999

Related U.S. Application Data

(63) Continuation of application No. 08/774,147, filed on Dec. 26, 1996, now Pat. No. 5,896,544.

(51) Int. Cl.$^7$ .................................................. G06F 13/14
(52) U.S. Cl. ......................... 710/3; 710/12; 710/16; 709/305; 713/100
(58) Field of Search .......................... 710/9, 3, 12, 16; 709/305; 713/100

(56) References Cited

U.S. PATENT DOCUMENTS

| | | |
|---|---|---|
| 4,130,865 | 12/1978 | Heart et al. . |
| 4,418,382 | 11/1983 | Larson et al. . |
| 4,656,472 | 4/1987 | Walton . |
| 4,821,185 | 4/1989 | Esposito . |
| 4,962,449 | 10/1990 | Schlesinger . |
| 4,987,530 | 1/1991 | Wagner et al. . |
| 5,003,463 | 3/1991 | Coyle et al. . |
| 5,261,057 | 11/1993 | Coyle et al. . |
| 5,339,425 | 8/1994 | Vanderah et al. . |
| 5,390,132 * | 2/1995 | Shioe et al. ........................... 709/224 |
| 5,418,927 | 5/1995 | Chang et al. . |
| 5,446,910 | 8/1995 | Kennedy et al. . |
| 5,471,618 | 11/1995 | Isfeld . |
| 5,483,640 | 1/1996 | Isfeld et al. . |
| 5,491,797 * | 2/1996 | Thompson et al. ................... 709/204 |
| 5,613,162 | 3/1997 | Kabenjian . |
| 5,664,098 | 9/1997 | Bianchi et al. . |
| 5,673,418 | 9/1997 | Stonier et al. . |
| 5,713,045 | 1/1998 | Berdahl . |
| 5,740,436 * | 4/1998 | Davis et al. .............................. 713/1 |
| 5,805,885 | 9/1998 | Leach et al. . |
| 5,896,544 * | 4/1999 | Connelly ................................. 710/3 |

OTHER PUBLICATIONS

Waters, Bryan; Mastering OLE 2; Chapter 5, Istorages and Istreams, pp. 82–86.

* cited by examiner

Primary Examiner—Thomas C. Lee
Assistant Examiner—Abdelmoniem Elamin
(74) Attorney, Agent, or Firm—Blakely, Sokoloff, Taylor & Zafman LLP

(57) ABSTRACT

A method and system for associating and selecting a set of I/O components as a source or destination of I/O data directed to or from an application. A set of I/O components are modeled as a component object model which becomes a generic access device (GAD) for those components. Relevant interfaces to the components are instantiated within the GAD. The GAD then hands out the interfaces to applications wishing to access the I/O devices modeled by the GAD. The application is thereby enabled to carry out meaningful communication with the I/O devices to which the GAD provided interfaces.

14 Claims, 7 Drawing Sheets

SOFTWARE DEVICE FOR SUPPORTING A NEW CLASS OF PC PERIPHERALS

This is a continuation of application Ser. No. 08/774,147, filed Dec. 26, 1996 now U.S. Pat. No. 5,896,544.

BACKGROUND OF THE INVENTION

(1) Field of Invention

The invention relates to access to personal computers. More specifically, the invention relates to providing distributed access to a personal computer by mostly cordless I/O devices located throughout the home or office.

(2) Related Art

Existing personal computer systems typically adhere to a two-foot model in which a grab bag of parts such as a monitor, a keyboard, and a mouse are available only if the user is present at (e.g., within two feet of) the computer system. If an application needs to render a sound, it defaults to the system's speakers because the application assumes that the user can hear the sound from those speakers. If the application must perform speech recognition, it uses the default system microphone because the user being locally located can speak into the system microphone. In the typical system, direct input comes from a one and only keyboard. Display information is provided to the system monitor, which is typically the only monitor. In this two foot model, it is implicitly assumed that the user is a local user. Thus, the application always think they know where the user is. Unfortunately, there is no way, when this assumption fails, for the application to identify where input/output communications should be received or sent.

As cordless I/O devices become increasingly common, the above assumption becomes less and less reliable. It is certainly possible to envision the situation in which I/O devices communicating with a host PC are located throughout the home or office. In such circumstances, it would become essential for applications to be able to identify a particular I/O device as a source or destination for particularly input/output stream.

BRIEF SUMMARY OF THE INVENTION

A method and system for associating and selecting a set of I/O components as a source or destination of I/O data directed to or from an application is disclosed. A set of I/O components are modeled as a component object model which becomes a generic access device (GAD) for those components. Relevant interfaces to the components are instantiated within the GAD. The GAD then hands out the interfaces to applications wishing to access the I/O devices modeled by the GAD. The application is thereby enabled to carry out meaningful communication with the I/O devices to which the GAD provided interfaces.

In one embodiment, the GAD provides a logical relationship between a plurality of I/O components such that the application may easily determine a correct output device based on a particular stimulus. Moreover, the GAD supports both high level actions on groups of components such as full duplex audio, as well as lower level action on individual components such as connecting a particular mic to a particular speaker.

In another embodiment, the interfaces are created independently of the application or applications that will use the interfaces. This results in a standard set of interfaces for I/O components generally. Moreover, because the interfaces are associated hierarchically within the GAD, the applications need not be able to build a high level interface to be able to access one.

DETAILED DESCRIPTION OF THE INVENTION

In the context of this description, a communicator is deemed to be a set of physical hardware components that could be used for interaction between the host PC and user. Such components include, without limitation, microphones, speakers, displays, keypads, sensors, sliders, lamps, joysticks, mice, and track balls. The two primary types of communicators are packaged communicators and synthesized communicators. A packaged communicator is a manufacture device which groups a plurality of hardware components used for user interaction as a single unit. The synthesized communicator consists of a set of hardware devices that are not physically packaged together. The synthesized communicator may be created by a user combining I/O devices, or they may be created by an application for a specific purpose. The prior art 2-foot paradigm is an example of a synthesized communicator having a display (the monitor), a keypad (the keyboard), and possibly a mic and speakers. Further explanation of synthesized and packaged communicators can be found below.

Communicators can be used to leverage the value of a host personal computer (PC) by providing distributed access to the PC's computing powers throughout a home or office. In order to accomplish this, it is necessary that communicators not be limited by proximity in the PC and that the PC be able to identify a correct communicator and correspondingly a correct I/O device of that communicator as a source or recipient of a particular communication from an application residing on the PC. The generic access device (GAD) of the instant invention permits applications to identify and establish communication with the correct communicator through an appropriate interface.

Figure 1:
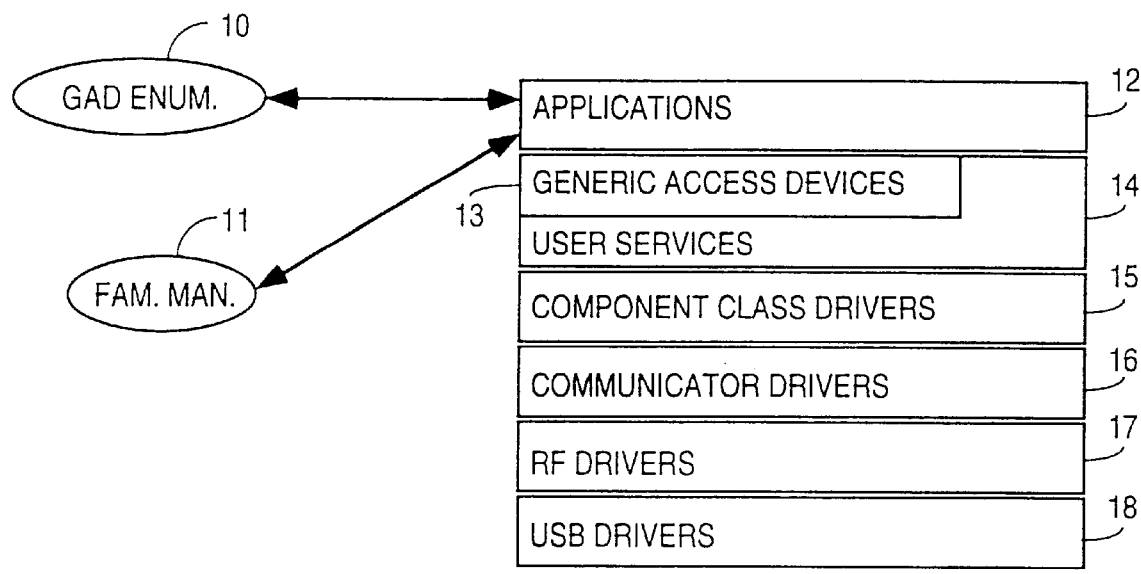
FIG. 1 shows a diagram of a software stack in one embodiment of the invention.

FIG. 1 shows a diagram of a software stack in one embodiment of the invention. The top layer in the software stack is the application layer 12. Applications in application layer 12 are ultimately responsible for interacting with a user. The I/O component or components that an application needs to use is application dependent, as are the interfaces that a specific application may desire. Accordingly, applications are responsible for locating the communicators that support the necessary components, as well as requesting the interfaces desired and supporting interaction using those interfaces. Because prior art default methods fail to achieve an acceptable result in multi-communicator systems, a GAD layer 13 is provided to model each communicator available to the application layer and to provide interfaces to the component(s) of those communicators when requested by an application.

The GAD layer 13 consists of the GADs available to the system. A GAD is software abstraction which makes it easier for the application to manage user interactions using diverse I/O components. Basically, the GAD is an association of I/O components and the interfaces to those I/O components which bridges the gap between hardware plug and play and application level interfaces. The GAD is instantiated as a component object model (COM). Once an application identifies a correct GAD, the application acquires the COM interface for that GAD. The application may then request from the GAD a particular component or an interface at a particular level. This allows the application to communicate with the I/O component on any desired level that is supported by the system. In this way, creation of infrastructure objects is separated from the use of interfaces. Thus, applications may use high level interfaces without knowing how to build them from the ground up.

The application in the application layer 12 controls the content and presentation of output data and is responsible for interpreting input data in a meaningful way. The application layer 12 may instantiate GADs to assist in the presentation of output and the interpretation of input. The application layer 12 is also supported by user services 14 which may, for example, be Win95 user services. Win95 is available from Microsoft Corporation of Redmond, Wash. Other drivers such as component class drivers 15, communicator drivers 16, radio frequency (RF) drivers 17, and Universal Serial Bus (USB) drivers 18 round out the stack and permit an application to communicate with components using the GAD provided interface.

Applications in application layer 12 view communicators as shared system resources that can be used by one or more of the applications. An application may claim all or part of a communicator. Ownership will depend particularly on the user services 14 supported by the system, e.g., some components may only allow a single application to access them at any time. Thus, if the requested component is already in use and the requesting application cannot gain priority, the GAD will reject the request to access that component. But if, for example, the application prefers to display text but can also do text to speech, the application is unable to acquire an interface to a display. It may still acquire an interface to a speaker of the same communicator if a speaker interface is available.

Since it is desirable in some embodiments of the invention that applications share a GAD (or at least the GAD may be accessed by more than one application even if the access is not simultaneous), an application must be able to identify whether a particular user input is directed to it. In this connection, it is envisioned that user communication be they voice commands, key strokes or other input will typically fall into one of three categories 1) context independent; 2) context free; and 3) context sensitive. Context independent input always goes to the same application. For example, "Dial" command may always go to the telephony application and bring that application into focus. A context free input goes to any application that wants it. For example, if a communicator had a "sleep" button, many applications may wish to receive notification that the sleep button has been pressed; e.g., the security application may want to turn on the alarm, a climate control application may lower the temperature, and a lighting application may turn off inside lights and turn on outside lights. A context sensitive input goes to an application with focus. For example, if the display is currently displaying a list of movies, a "scroll down" command would be context sensitive and need only be made available to the application displaying the movie listing. Providing this input to any other application would create an indeterminable result as there is no context for the "scroll down" command when the application has no display.

The GAD enumerator 10 assists an application in locating a desired GAD. The GAD enumerator 10 stores advertisements for all the GADs available on the PC. An advertisement provides attributes of a GAD such as the components and/or possibly the interfaces available through the GAD. By looking at the advertisement, an application can determine if the corresponding communicator is suitable for its purposes. For example, if the application is intended to display a list of movies currently playing, a GAD for a communicator without a display will not be very useful unless the application can also convert text to speech and read the list to the user. In any event, a GAD with a display would likely be preferred. If the GAD meets the application's requirements, the application may notify the GAD enumerator that it is interested in being notified of input from the GAD and may also install particular commands in the GAD's voice menu. The voice menu is a mapping of all relevant voice commands accepted by the applications watching the GAD.

Applications capable of association with GADs will want to be notified of GAD creation and/or modification. When the application is installed and becomes part of the application layer 12, it will check the GAD enumerator 10 and request notification of activity on the GADs it deems relevant. The application will also likely request notification in the event other GADs are created or existing GADs are modified. In this way, the application will be able to request input from newly created GADs, thereby remaining current as the system expands. Alternatively, the application may be required to periodically recheck the GAD enumerator without first being notified, however, this does not use resources as efficiently.

The family manager maintains additional objects for access by the application layer such as, e.g., who lives in the house, schedules of family member or possibly a protocol for reaching a family member if an application needs to. One example in which this may be useful is stock trading application. If DAD wants to know when STOCK reaches value X, the application will have some process for reaching DAD. Assuming multiple communicators, how does the application find DAD's GAD! The family manager is used to provide relevant information to the application to maximize the application's chance of reaching DAD.

Figure 2:
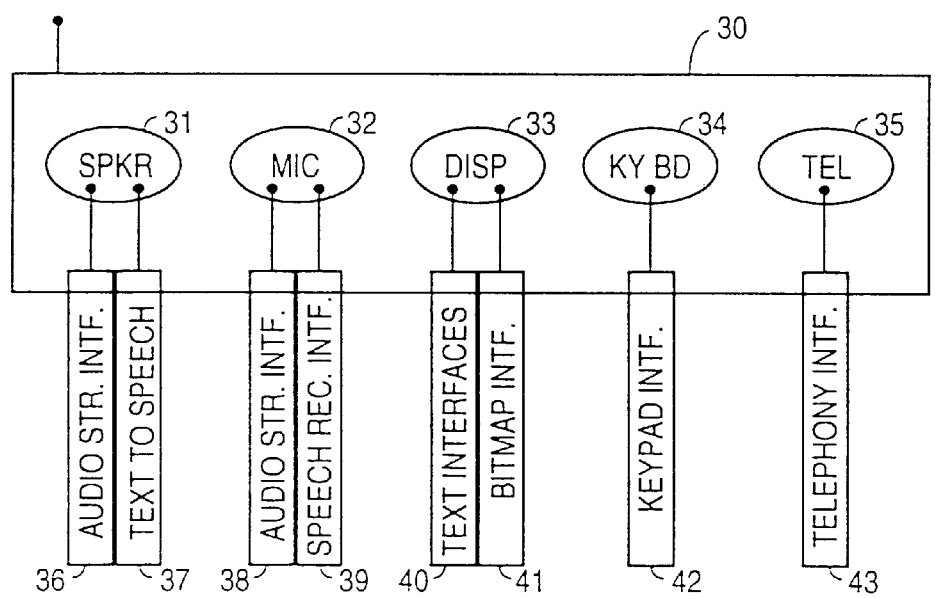
FIG. 2 shows a component object model of one exemplary generic access device.

FIG. 2 shows a COM of one exemplary GAD 30. The GAD 30 is a COM of a system including a speaker 31, a microphone 32, a display 33, keyboard 34, telephone 35. To support the speaker component, an audio streaming interface 36 and a text to speech interface 37 are associated with the speaker component 31. Similarly, the mic component 32 has associated therewith an audio streaming interface 38 and a speech recognition interface 39. The display component 33 has a text interface 40 and a bitmap interface 41 associated therewith. Keyboard 34 has a keypad interface 42 associated with it, while the telephone component 35 has a telephony interface 43 associated therewith. The application which accesses GAD 30 may, for example, request mic component 32, or it may request a specific interface, e.g., an audio streaming interface 36. Significantly, a communicator and, therefore, its GAD need not have all the listed components and may have more different and/or duplicate components. For example, a GAD may model a communicator that is solely, e.g., a motion sensor. In such case, the COM would contain only a single component. Alternatively, a communicator may have, e.g., two displays, one devoted to text and one devoted to bitmaps; two keypads, etc. without departing from the scope of the invention.

Figure 3:
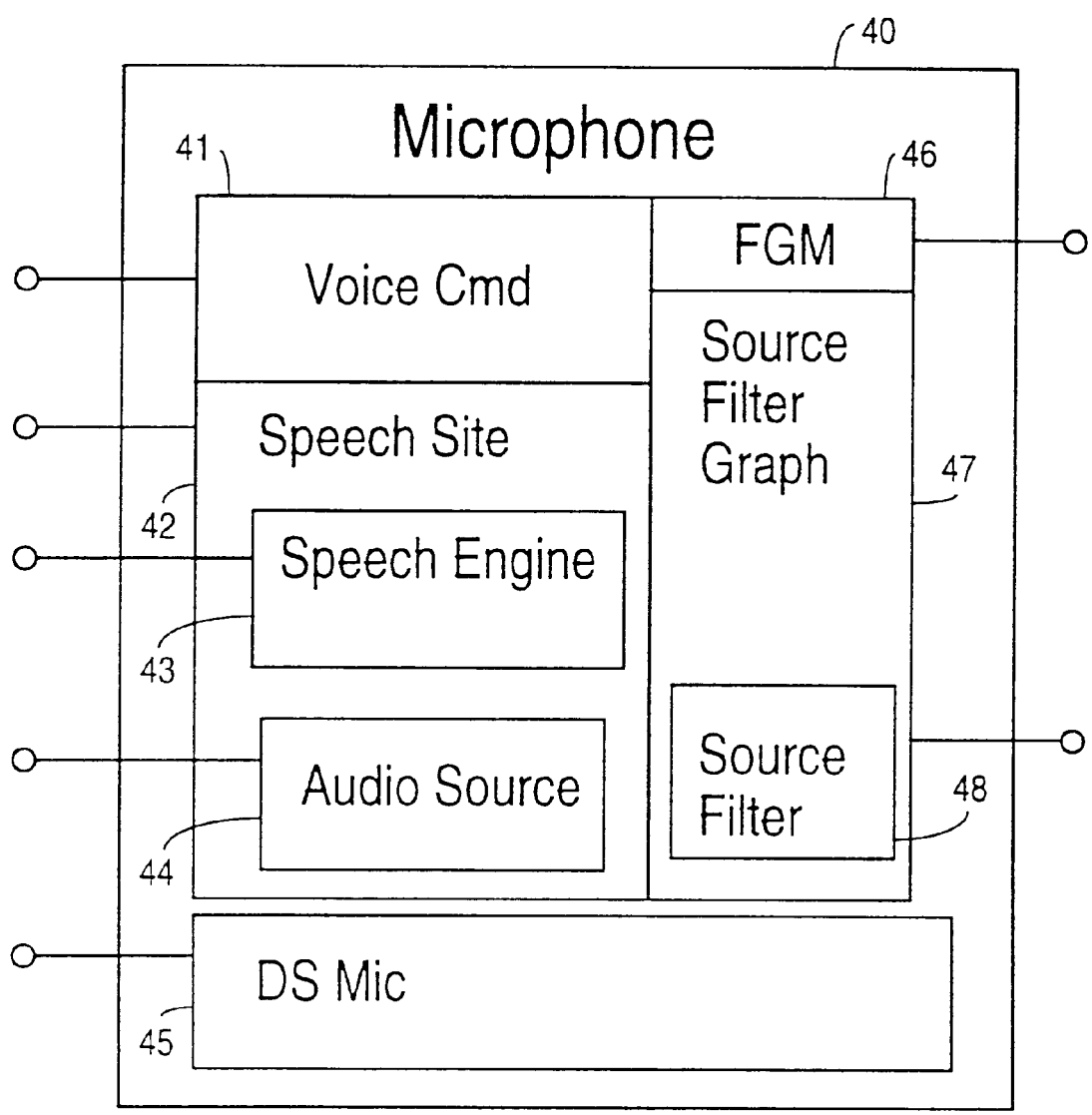
FIG. 3 shows the component object model of a microphone component in one embodiment of the invention.

FIG. 3 shows the COM of a microphone component which may be part of a particular communicator and, therefore, part of a GAD. The interfaces are arranged in a hierarchical order with the highest level interfaces on top down to the lowest level interface at the bottom. The microphone COM 40 includes a voice command interface 41 which sits atop a speech site interface 42. Speech site interface 42 also contains a speech engine interface 43 and an audio source interface 44. At the lowest level, it is a DS mic interface 45. The above-mentioned interfaces all relate generally to the speech recognition capabilities of the microphone interface 40. The other function of a microphone is, of course, audio streaming. To that end, a filter graph manager (FGM) interface 46 is provided atop surface source filter graph 47 and source filter 48. One advantage of using the GAD construct of the invention is that high level interfaces may be constructed once, and then used by multiple applications. For example, the voice command interface 41 need only be stacked atop the speech site 42 with its speech engine 43 and audio source 44 and further on top of the DS mic 45 one time. In prior art systems, each application was required to instantiate the layers of the interface to achieve the high level voice command interface 41. Interfaces analogous to microphone interface 40 shown in FIG. 3 can be provided for each of the components associated with the GAD. For example, a speaker COM may include an FGM, a render filter graph, a render filter and a DS speaker interface, as well as a text command interface, a text to speech side with a speech engine and an audio destination interface.

Figure 4:
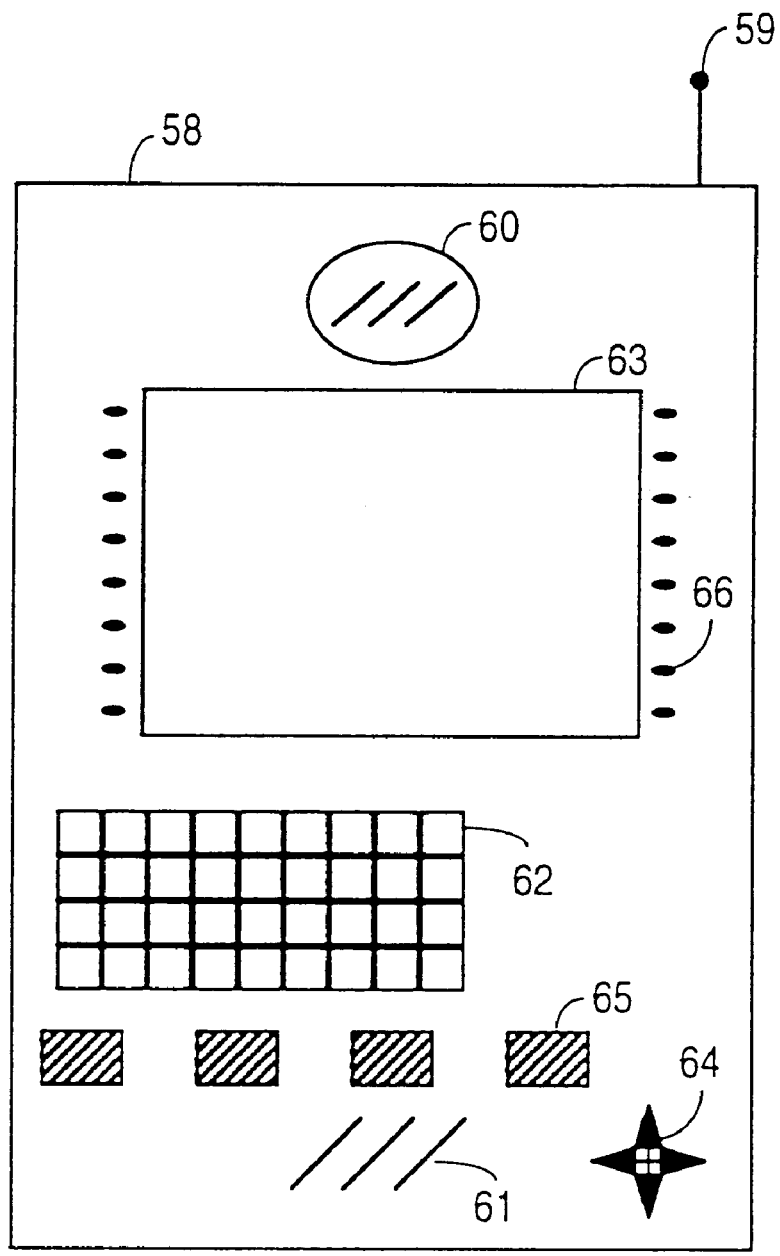
FIG. 4 shows one example of a communicator which includes a speaker, a microphone, a keypad, and a display.

FIG. 4 shows one example of a communicator 58. The communicator 58 may, for example, communicate via an RF link through antenna 59. Communicator 58 includes a speaker 60, a microphone 61, a keypad 62, and a display 63. Additionally, a directional control component 64 and additional key sets 65 and buttons 66 are included. A GAD for packaged communicator 58 would be required to have the representation of each component and appropriate interfaces. Significantly, packaged communicator 58 may itself be part of a synthesized communicator. Thus, the GAD should accommodate additions and deletions of associated components. For example, when a user holding package communicator 58 is in the family room and has access to the television screen, the television screen may be associated with packaged communicator 58, thereby providing greater display capability to the synthesized communicator than would have been available in the packaged communicator alone. Similarly, the television speakers might also be associated with the packaged communicator 58, thereby providing a more robust sound system. This, of course, creates an issue that if the proximity of the packaged communicator is insufficiently close to practically use display or speaker from the television, it is important to disassociate those speakers from the packaged communicator so that an application does not inadvertently acquire an interface to a no longer relevant component. This issue is discussed more fully below in connection with FIG. 6.

Figure 5:
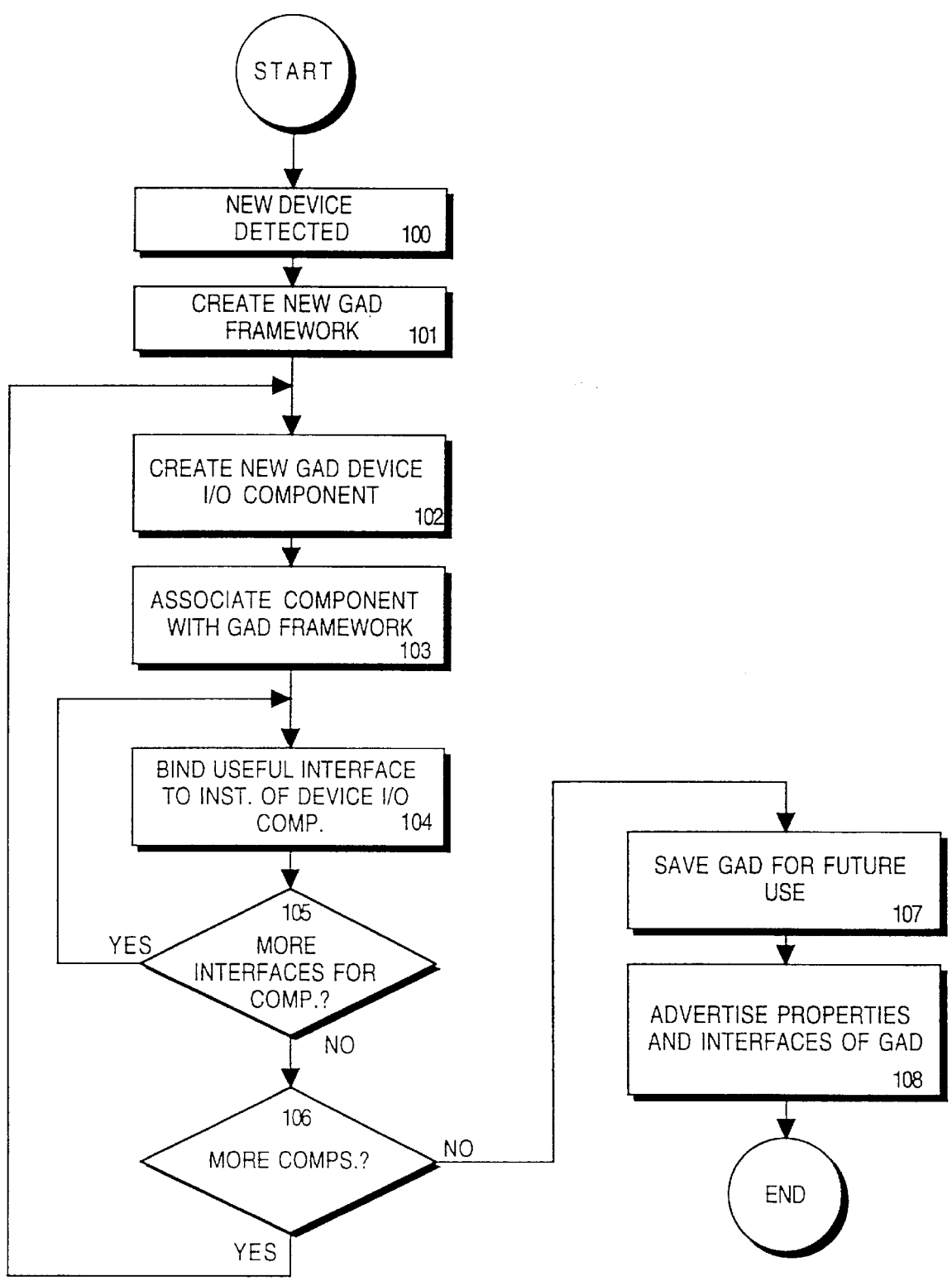
FIG. 5 is a flowchart of creation of a generic access device in one embodiment of the invention.

FIG. 5 is a flowchart of creation of a GAD in one embodiment of the invention. At functional block 100, a new device is detected. In one embodiment, turning on the communicator the first time results in a signal received at the PC. The signal informs the PC of the components and interfaces supported on the communicator. For wireless communicators, the signal may be an RF transmission. In the wireless RF case, the issue arises as to which PC instantiates the GAD if more than one PC is present. It is desirable to have a communicator associated with only one PC. Therefore, some method of ensuring association with the correct PC is desirable. For example, one PC may be set to accept and instantiate all GADs or the communicator may be brought to the desired PC and introduced by, e.g., turning it on in proximity thereto. Alternatively, a communicator may require an, e.g., installation disk to introduce the communicator to the system. In either case, in response to the detection of a new device at functional block 101, a new GAD framework is created.

At functional block 102, a representation of an I/O component on the device is created. At functional block 103, the newly created representations of the device I/O components are instantiated into the GAD framework. At functional block 104, useful interfaces are bound to the instantiation of the device I/O component. At decision block 105, it is determined that all useful interfaces have been bound to that instantiation of the device I/O component. If not, additionally useful interfaces are bound thereto at functional block 104. If all useful interfaces have already been bound to the device I/O component, a determination is made at decision block 106 whether there are additional components on the device. If there are, a new GAD device I/O component is created for the next component on the device, and the process continues at functional block 102. If there are no more components to be instantiated, the GAD is saved on the host PC for future use at functional block 107. Finally, at functional block 108, the properties and interfaces of the GAD are advertised possibly through the GAD enumerator discussed above.

Figure 6:
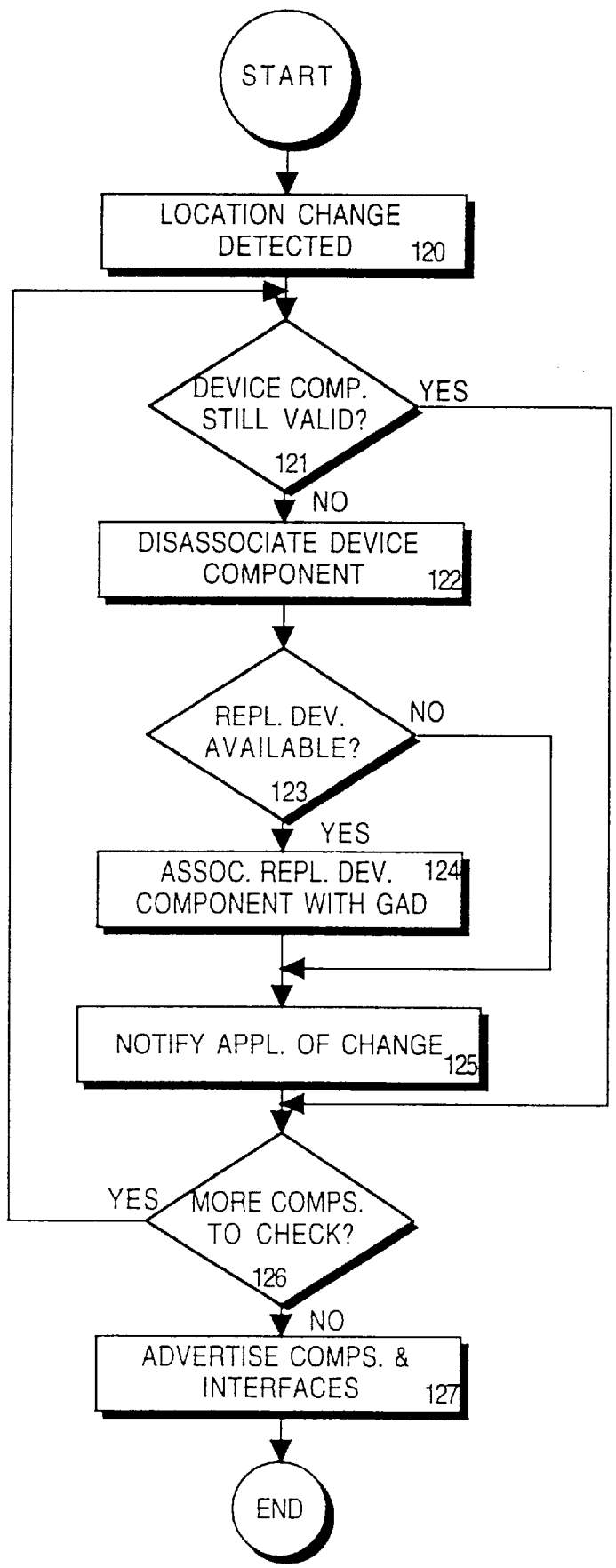
FIG. 6 is a flowchart of effects on the generic access device in response to a location change.

FIG. 6 shows a flowchart of effects on the GAD in response to a location change of, for example, an underlying packaged communicator which is part of a synthesized communicator. At functional block 120, a locating change is detected. The detection of the location change may be because the user indicates that location is changing or by virtue of sensors located in the area. In one embodiment, user indication may take the form of voice commands or key strokes depending on the components and interfaces supported by the system. In response to the location changes, determination is made at functional block 121 if a device component currently associated with the GAD is still valid. If it is not, the device component is disassociated at functional block 122. At decision block 123, a determination is made if a replacement device is available. If there is a replacement device available, it is associated with the GAD at functional block 124. For example, if the package communicator is using the family room television as a display and the user carries the packaged communicator to the bedroom, if there is a television in the bedroom, that television may then become the associated display component in the GAD. If at decision block 123 no replacement device is available, any application using the disassociated device must be notified that it is no longer available. At functional block 125, applications which are watching the GAD or using the GAD are notified of the change in device components. At decision block 126, the determination is made if there are more components to check based on the change in location. If not, the existing components in interface are advertised at functional block 127. If there are more components to check, the next device is checked for validity at decision block 121 and the flow continues.

Figure 7:
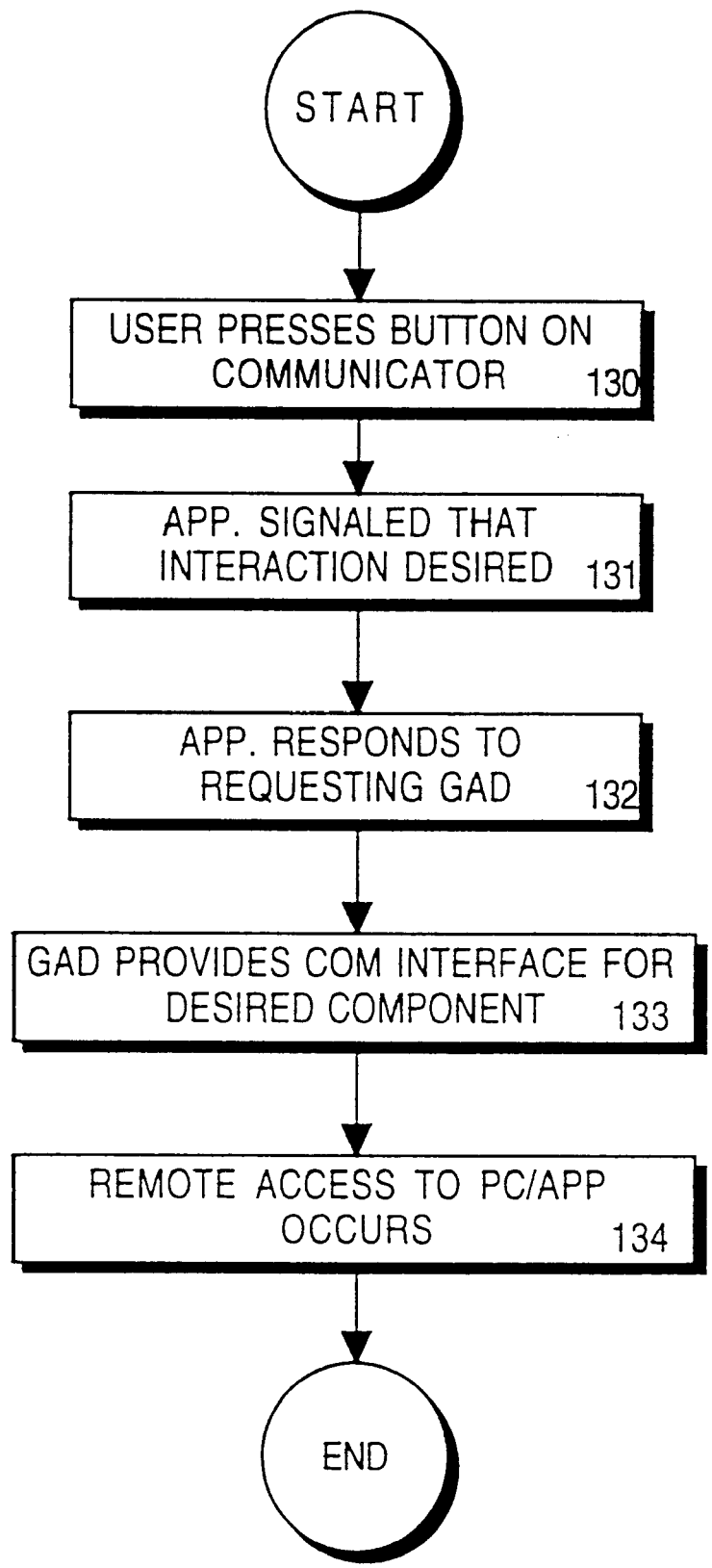
FIG. 7 is a flowchart of the user-initiated transaction in one embodiment of the invention.

There are basically two types of transactions which can occur involving a communicator: user-initiated transactions and application-initiated transactions. FIG. 7 is a flowchart of the user-initiated transactions in one embodiment of the invention. At functional block 130, a user presses a button on the communicator keypad or speaks a voice command or similar action which causes the communication to awaken. In response to the button press or command, the GAD layer notifies the applications which have expressed interest in watching for a particular communicator that an awaken event has occurred. Those applications then watch the GAD for an input deemed relevant to a particular application. At functional block 132, the application identifies itself to the requesting GAD, and the GAD provides the COM interface for the desired component to the responding application at functional block 133. Remote access to the application then occurs using the interfaces and user services provided on the system.

Figure 8:
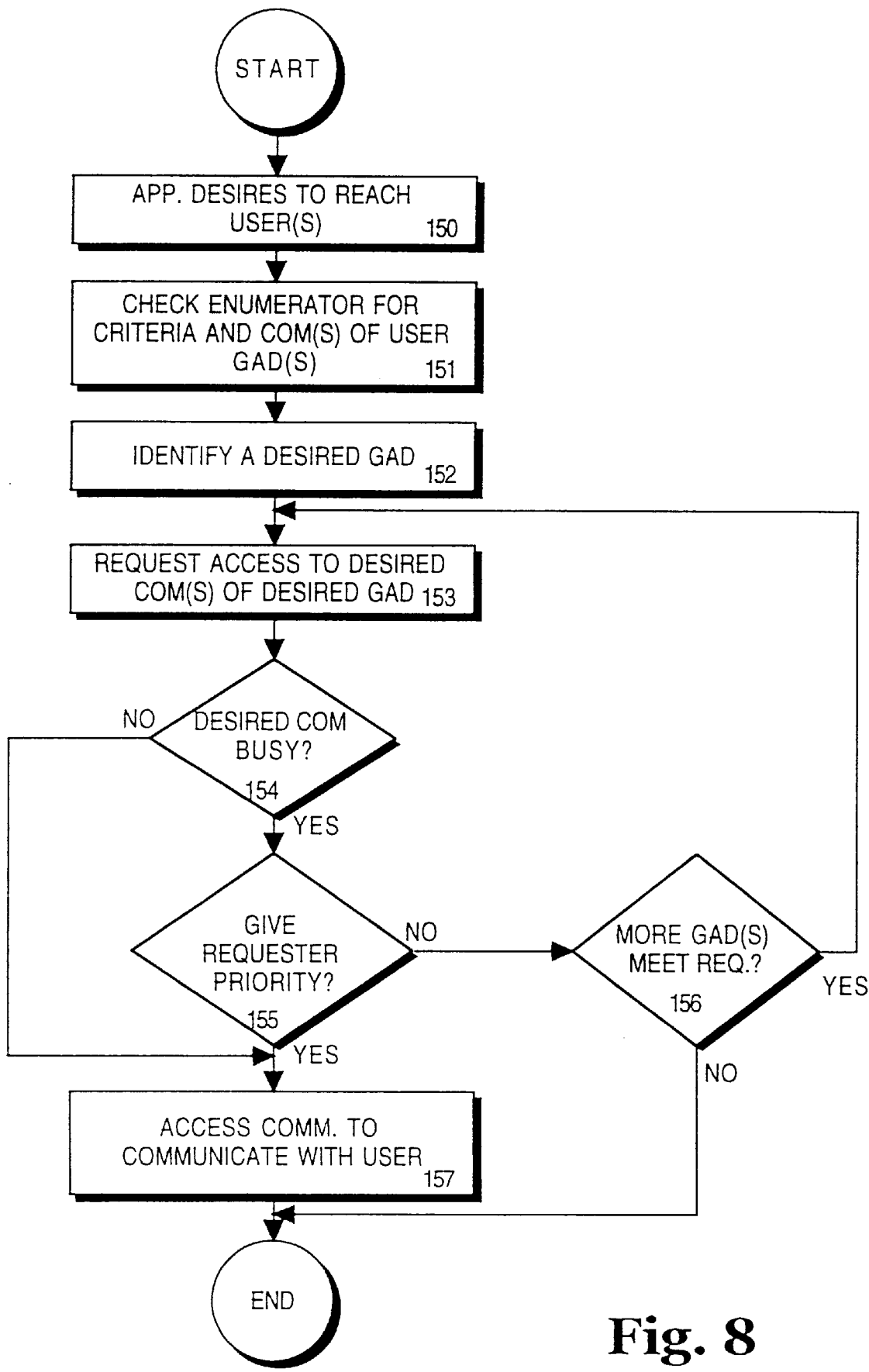
FIG. 8 is a flowchart of application-initiated contact with a communicator.

FIG. 8 is a flowchart of application-initiated contact with the communicator. At functional block 150, the application desires to reach a particular user or users. The application then checks the GAD enumerator and possibly the family manager for criteria and COMs of the user or users GAD or GADs. From these criteria, the application identifies a desired GAD at functional block 152. The application then requests access to desired COM interfaces of the desired GAD at functional block 153. At decision block 154, if the desired COM interface is busy, a determination is made at decision block 155 whether to give the new requester priority. If the new requester is not given priority at decision block 155, a determination is made at decision block 156 whether more GADs meet the requirements of the application. If they do, the application can again request access to another GAD at decision block 153. If the requester is given priority at decision block 155, the application then has access to the communicator and may communicate with the user via the communicator modeled by the GAD. This is also true if at decision block 154, it is determined that the desired COM is not busy.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method of supporting a plurality of I/O devices remove from a host computer, the method comprising:
   associating interfaces to the plurality of I/O devices together to form a generic access device (GAD);
   identifying the GAD as a source of interfaces to the plurality of I/O devices;
   obtaining from the GAD an interface to at least one remote I/O device; and
   communicating between the host computer and at least one I/O device using the interface provide by the GAD.

2. The method of claim 1 wherein the interfaces to the plurality of I/O devices include at least one of an audio streaming interface, a speech recognition interface, a keypad interface, and a display interface.

3. The method of claim 1 wherein associating includes associating at least one input interface and at least one output interface of the interfaces to the plurality of I/O devices to form a GAD.

4. The method of claim 1 wherein obtaining includes obtaining at least one input interface and one output interface to at least one remote I/O device.

5. The method of claim 1 wherein communicating includes communicating through at least one input interface and one output interface provided by the GAD.

6. A method of communicating with a plurality of associated I/O devices remote from a personal computer comprising:
   associating a plurality of component object model (COM) interfaces to the plurality of I/O devices as a generic access device (GAD); and
   requesting from the GAD by an application program a COM interface which supports a desired type of interaction specified by the application program.

7. The method of claim 6 wherein the desired type of interaction is one of audio streaming, graphic display, speech recognition, and keypad input.

8. A computer system that allows computer resources to be used at a location remote from a host processor, the system comprising:
   the host processor having the plurality of local I/O devices associated therewith;
   a plurality of remote I/O devices associated as a unit for purposes of communication with the processor; and
   a generic access device (GAD) storing an association between the remote I/O devices and a plurality of interfaces thereto, the GAD residing local to the host processor.

9. A method of supporting a plurality of I/O devices remote from a host computer, the method comprising:
   associated interfaces to the plurality of I/O devices to form generic access devices (GADs) according to a specified scheme;
   identifying at least one GAD as a source of at least one interface providing functionality requested by an application program on the host computer;
   obtaining from an identified GAD at least one interface to at least one I/O device;
   communicating between an application program on the host computer and at least one I/O device through an interface obtained from the identified GAD.

10. The method of claim 9 wherein identifying comprises the steps of:
    invoking a GAD enumerator which enumerates criteria for identifying a GAD;
    selecting all GADs which meet the enumerated criteria; and
    identifying a best GAD based on the criteria enumerated.

11. The method of claim 10 wherein the criteria include at least one of a location of the I/O device, a time of day, an interface supported by the I/O device, a status of whether the I/O device is currently being used by another application program, an owner of the I/O device.

12. The method of claim 9 wherein the specified scheme is the physical proximity of the I/O devices to one another.

13. A method of communicating with a plurality of I/O devices remote from a personal computer comprising:
    associating a plurality of COM interfaces to the plurality of I/O devices into multiple GADs according to a specified scheme;
    grouping the GADs into a GAD layer; and
    requesting from the GAD layer by an application program a GAD which provides at least one COM interface which supports functionality specified by the application program.

14. The method of claim 13 wherein the specified scheme is the physical proximity of the I/O devices to one another.

* * * * *

UNITED STATES PATENT AND TRADEMARK OFFICE
CERTIFICATE OF CORRECTION

PATENT NO.    : 6,212,579 B1
DATED         : April 3, 2001
INVENTOR(S)   : Connelly It is certified that error appears in the above-identified patent and that said Letters Patent is hereby corrected as shown below:

<u>Column 7,</u>
Line 45, delete "remove" and insert -- remote --.

Signed and Sealed this

Twenty-first Day of May, 2002

*Attest:*

*Attesting Officer*

JAMES E. ROGAN
*Director of the United States Patent and Trademark Office*